United States Patent
Dow et al.

(10) Patent No.: US 9,626,031 B2
(45) Date of Patent: Apr. 18, 2017

(54) ROTATING RING FOR DEVICE CONTROL

(71) Applicant: International Business Machines Corporation, Armonk, NY (US)

(72) Inventors: Eli M. Dow, Wappingers Falls, NY (US); Thomas D. Fitzsimmons, Poughkeepsie, NY (US); Joseph D. Harvey, Binghamton, NY (US); Douglas E. Rohde, East Meadow, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/862,556

(22) Filed: Sep. 23, 2015

(65) Prior Publication Data
US 2016/0378235 A1    Dec. 29, 2016

Related U.S. Application Data (63) Continuation of application No. 14/753,106, filed on Jun. 29, 2015.

(51) Int. Cl.
*G06F 3/041* (2006.01)
*G06F 3/0362* (2013.01)

(52) U.S. Cl.
CPC .......... *G06F 3/0414* (2013.01); *G06F 3/0362* (2013.01)

(58) Field of Classification Search
None
See application file for complete search history.

(56) References Cited

U.S. PATENT DOCUMENTS

| | | | |
|---|---|---|---|
| 5,489,922 A | 2/1996 | Zloof | |
| 5,832,296 A | 11/1998 | Wang et al. | |
| 7,145,549 B1 | 12/2006 | Sun | |
| 7,427,979 B2 | 9/2008 | Park et al. | |
| 8,055,299 B2 | 11/2011 | Rhee et al. | |
| 8,243,051 B2 | 8/2012 | Gorodetskiy et al. | |
| 8,636,624 B2 | 1/2014 | Liberman et al. | |
| 2011/0007035 A1 | 1/2011 | Shai | |
| 2011/0018794 A1 | 1/2011 | Linsky et al. | |
| 2011/0221672 A1 | 9/2011 | Osterhout et al. | |
| 2012/0075173 A1* | 3/2012 | Ashbrook | G06F 3/014 345/156 |

(Continued)

FOREIGN PATENT DOCUMENTS

| | | |
|---|---|---|
| EP | 2457137 A1 | 5/2012 |
| KR | 1020020072081 A | 9/2002 |
| TW | 201237685 A | 9/2002 |

OTHER PUBLICATIONS

Appendix P.: List of IBM Patents or Patent Application's Treated as Related.

(Continued)

*Primary Examiner* — Kenneth B Lee, Jr.
(74) *Attorney, Agent, or Firm* — Isaac J. Gooshaw (57) ABSTRACT

A ring device to be worn on a digit of a user is provided. The ring device includes an inner ring suitable to be worn on a digit of a user and a housing rotatably coupled to the inner ring. Along the housing a touch surface is located along with touch sensors configured to detect a touch input. Additionally, the ring includes rotary sensors configured to detect rotation of the housing.

4 Claims, 6 Drawing Sheets

(56) References Cited

U.S. PATENT DOCUMENTS

2014/0266026 A1 9/2014 Dowd et al.

OTHER PUBLICATIONS

"Inductive charging", From Wikipedia, the free encyclopedia, last modified on Mar. 13, 2015, 7 pages, <http://en.wikipedia.org/wiki/Inductive_charging>.
"Kinekt" Innovation Elevated, provided in the main idea dated Jul. 16, 2013, 2 pages, <http://www.kinektdesign.com/product-gear-ring.php>.
"Apple iRing the Bluetooth Ring Concept", provided in the main idea dated Jul. 16, 2013, 5 pages, <http://www.igadgetware.com/2012/03/apple-iring-bluetooth-ring-concept.html>.
U.S. Appl. No. 14/753,106, Entitled "Rotating Ring for Device Control", Filed on Jun. 29, 2015.

* cited by examiner

ROTATING RING FOR DEVICE CONTROL

BACKGROUND OF THE INVENTION

The present invention relates generally to the field of communication technology, and more particularly to an input device worn by a user.

The modern communications era has brought about a tremendous expansion of wireline and wireless networks. Computer networks, television networks, and telephone networks are experiencing an unprecedented technological expansion fueled by consumer demands. Together with these expanding network capabilities and communication speeds, the devices that use these networks have experienced tremendous technological steps forward in capabilities, features, and user interface. Such devices may also use accessories such as remote input devices, wireless headsets or wired headsets with limited functional capabilities. Devices communicating via these networks may be used for a wide variety of purposes including, among other things, Short Messaging Services (SMS), Instant Messaging (IM) service, E-mail, voice calls, music recording/playback, video recording/playback, and internet browsing. Such capabilities have made these devices very desirable for those wishing to stay in touch and make themselves available to others.

Hands free devices have increased in popularity through the advent of laws prohibiting hand-held mobile device usage when driving a vehicle and the desire of users to communicate without monopolizing the use of a hand. Such devices may include a wired headset that is physically connected to a mobile device or a wireless headset that is connected to a mobile device through a wireless Personal Area Network connection. Additionally, wireless vehicle accessories may allow a user to use a speaker and microphone within a vehicle to communicate over their mobile device. Such devices may enable the user of a mobile device to carry on a voice call through their mobile device without having to hold the device. Further, a wireless headset or vehicle accessory may allow a user to carry on a voice call while the device remains in a purse, pocket, glove box, or other nearby location that may not be readily accessible. Such wireless devices or headsets and vehicle accessories using other communications protocols may have limited functionality with respect to a device to which they are paired or synchronized.

SUMMARY

A ring device to be worn on a digit of a user is provided. The ring device includes an inner ring suitable to be worn on a digit of a user and a housing rotatably coupled to the inner ring. Along the housing a touch surface is located along with touch sensors configured to detect a touch input. Additionally, the ring includes rotary sensors configured to detect rotation of the housing.

A method for determining intentional input to a touch surface of a wearable device is provided. The method includes identifying a first interaction by a user with the touch surface. The method includes determining an amount of force applied by the first interaction. The method includes determining a duration the first interaction occurred. The method includes, in response to the amount of force applied by the interaction being above a first threshold and the duration the interaction occurred being below a second threshold, storing the first interaction.

A method of identifying a user of a wearable device is provided. The method includes determining the wearable device is being worn by the user. The method includes determining an identity of the user. The method includes, in response to the identity of the user being authorized to use the wearable device, identifying a profile of the user. The method includes, in response to one or more interactions with the wearable device, determining a command based, at least in part, on the one or more interactions and the profile of the user. The method includes sending the command to a computing device for execution.

DETAILED DESCRIPTION

While solutions to providing hands-free devices are known, they offer limited functionality and interaction with connected devices. Prior solutions rely on either voice commands or gestures to interact with devices. Such interactions take time to perform and recognize by the hands-free devices. For example, voice commands need to be recorded, and then recognized, before a command can be performed. Embodiments of the present invention recognize that by providing a ring device to be worn be a user faster input and response is achieved with a connected device. Furthermore, embodiments of the present invention provide various input mechanisms to allow users to select a greater array of input commands to send to a connected device. Embodiments of the present invention provide a rotating portion of the ring device. In such cases, the rotating ring provides faster selection of menu items for a connected device, such as a mobile phone, smart TV or augmented reality (AR) glasses. Additionally, embodiments of the present invention provide a portion of the ring device with a touch sensitive sensor. In such cases, the touch sensitive sensor allows for faster input of commands, such as tapping or pressing of the ring by the user. Prior solutions also require time to charge and must be taken off by the user during such time. Embodiments to the present invention provide an induction component that generates electrical charge to recharge a battery of the ring while a user operates or wears the device. As such, embodiments to the present inventions provide mechanisms to receive user input with minimal effort while allowing for long periods of use.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
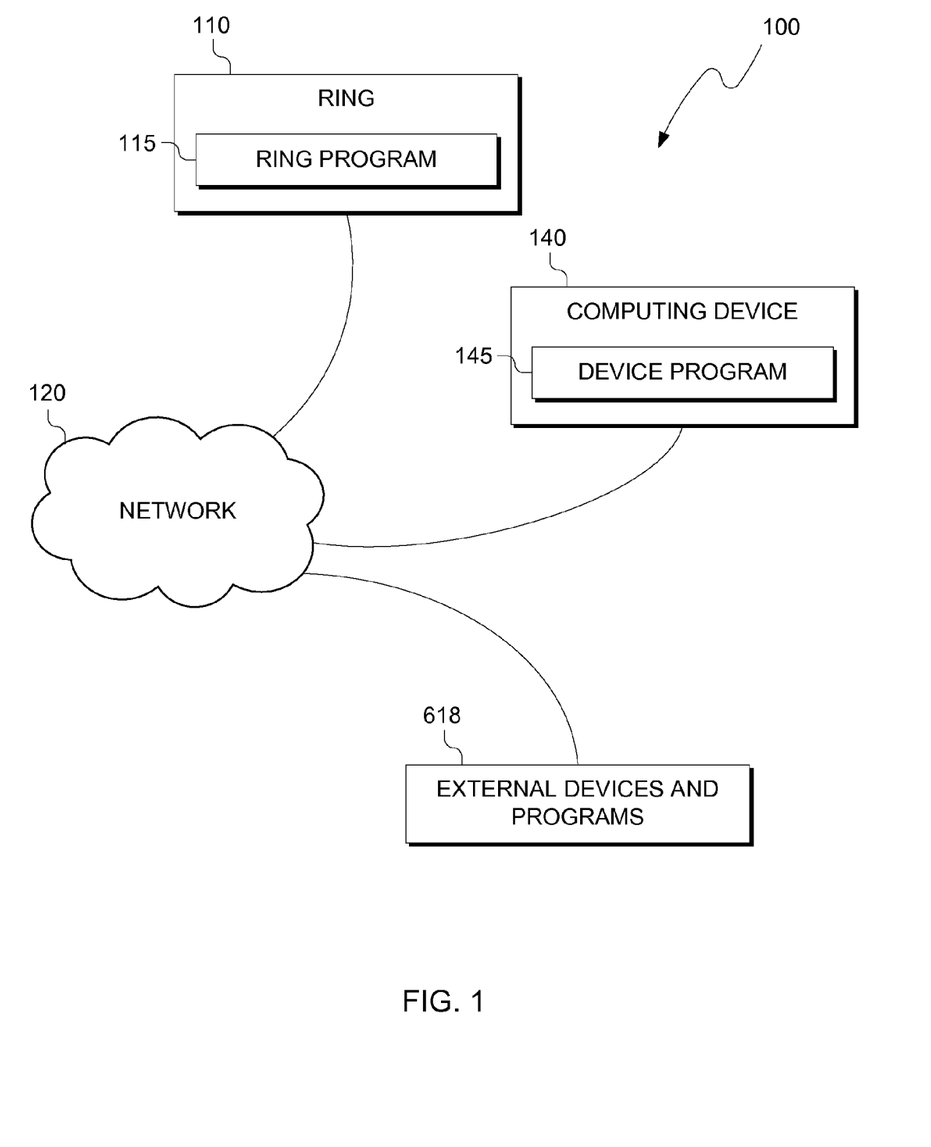
FIG. 1 is a functional block diagram illustrating a user interface environment, in accordance with an exemplary embodiment of the present invention.

The present invention will now be described in detail with reference to the Figures. FIG. 1 is a functional block diagram illustrating user interface environment, generally designated 100, in accordance with one embodiment of the present invention. User interface environment 100 includes ring 110 and computing device 140 connected over network 120. Ring 110 includes ring program 115 and computing device 140 includes device program 145.

In various embodiments of the present invention, ring 110 and computing device 140 are each a computing device that can be a standalone device, a server, a laptop computer, a tablet computer, a netbook computer, a personal computer (PC), a desktop computer, smartphone, smart television, or augmented reality glasses. In another embodiment, ring 110 and computing device 140 each represent a computing system utilizing clustered computers and components to act as a single pool of seamless resources. In general, ring 110 or computing device 140 can be any computing device or a combination of devices with access to, and is capable of executing, ring program 115 or device program 145. Ring 110 and computing device 140 may include internal and external hardware components, as depicted and described in further detail with respect to FIG. 6. In various embodiments, computing device 140 has access to various devices and programs that a user may wish to control using ring 110. For the sake of simplicity, specific devices and programs are not shown in FIG. 1 but are represented by external devices and programs 618 being connected to computing device 140 via network 120. As described below and shown in FIG. 6, such devices include one or more respective programs (not shown) are represented by external devices and programs 618 and are in communication with computing device 140. In some embodiments, such external devices 618 include devices such as multimedia systems, for example televisions and stereos, as well as computing systems such as laptops, personal computers, and smartphones, smart televisions, augmented reality glasses and their associated software.

In this exemplary embodiment, ring program 115 is stored on ring 110. Device program 145 is stored on computing device 140. However, in other embodiments, ring program 115 and device program 145 may be stored externally and accessed through a communication network, such as network 120. Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that will support communications between ring 110, ring program 115, computing device 140, device program 145 and other devices and programs connected to network 120, such as external devices and program 618, in accordance with a desired embodiment of the present invention.

Figure 2A:
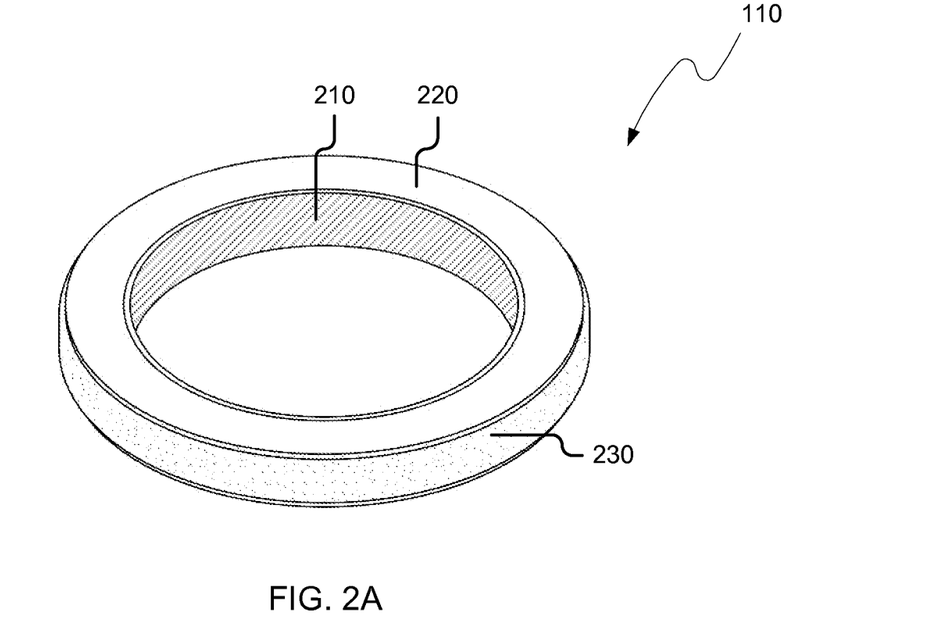
FIG. 2A illustrates a perspective view of a ring that functions as an input device, in accordance with an exemplary embodiment of the present invention.
Figure 2B:
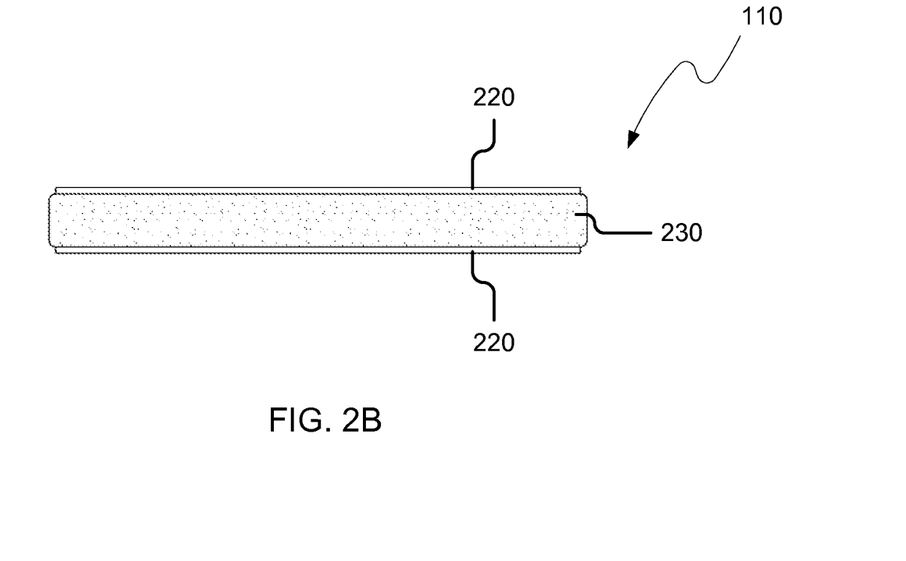
FIG. 2B illustrates a side view of a ring that functions as an input device, in accordance with an exemplary embodiment of the present invention.

FIGS. 2A & 2B illustrate a perspective view and a side view, respectively, of ring 110, in accordance with an exemplary embodiment of the present invention. Ring 110 includes inner ring 210, housing 220, and touch surface 230. In some embodiments, housing 220 and touch surface 230 are rotatable in both clockwise and counterclockwise directions relative to inner ring 210. In other embodiments, touch surface 230 is rotatable in both clockwise and counterclockwise directions relative to inner ring 210 and housing 220. In some cases, a user wears ring 110 on a digit of the hand. When worn on a digit (e.g., a finger) a user interacts with ring 110 with the user's thumb. When worn on a thumb, the user interacts with ring 110 with the user's finger of the user's hand. Alternatively, ring 110 may be interacted with the digits of the hand opposite of the hand on which ring 110 is worn. In some embodiments, touch surface 230 or housing 220 rotatable for a 360° rotation relative to inner ring 210. In other embodiments, surface or housing 220 are rotatable for a fixed amount less than 360°. In further embodiments, one or more springs, rubber or other elastic mechanism provides a return-to-center capability of one or both of the rotated touch surface 230 or housing 220. Upon release, touch surface 230 or housing 220 return to the originating point prior to rotation. In another embodiment, ring 110 includes two independently rotatable portions. The first rotatable portion is proximal to the base of the digit ring 110 is worn and the second rotatable portion distal to the base of the digit ring 110 is worn.

In various embodiments, touch surface 230 receives touch input from a digit of the user. In some embodiments, touch surface 230 covers the circumference of housing 220. In other embodiments, a portion of the circumference of housing 220 is covered by touch surface 230. Touch surface 230 includes one or more touch sensitive sensors to determine that touch surface 230 has been touched and a force applied to touch surface 230. In some embodiments, touch surface 230 extends past or is flush with the side surfaces of housing 220. In other embodiments, touch surface 230 is recessed in housing 220. In such embodiments, a digit of the user may rotate housing 220 without interaction with touch surface 230. In an embodiment, touch surface 230 covers the top and bottom sides of housing 220 to provide a larger area for user interaction by a wearer of ring 110.

In various embodiments, ring 110 and computing device 140 each include communication hardware and software, such as a communication device configured for communicating via wireless Personal Area Networks (WPANs) (such as via the IEEE 802.15 or 802.11 standards), infrared (IrDA), ultra wideband (UWB), and the like. While not shown, such a communications device may comprise a processor, transceiver, transmitter, receiver, or the like embedded within ring 110 and an antenna, in communication therewith, which may be disposed about the perimeter of ring 110. Ring 110 may further include processing hardware and software for processing data (e.g., input data, sensor data, etc.) such as a processor or circuitry with the processing capabilities necessary for implementation of embodiments of the present invention.

In various embodiments, ring 110 is synchronized or paired with computing device 140. A communication device of ring 110 connects to and communicates with a communication device of computing device 140. Ring program 115 and device program 145 send and receive information via the above connection of communication devices. Ring program 115 receives input a variety of sensors of ring 110. The sensors of ring 110 send input to ring program 115 based on interactions with ring 110 by a wearer. In response to receiving an input from one or more sensors of ring 110, ring program 115 sends a corresponding command to device program 145. For example, a tap on the touch surface 230 corresponds to a selection option in a menu in device program 145. As another example, a rotation of touch surface 230 or housing 220 corresponds to a changing of a menu item in device program 145.

In various embodiments, touch surface 230 includes one or more touch sensitive sensors to determine a touch interaction by a user with touch surface 230. For example, touch surface 230 includes a capacitive touch sensor array that is flexible, covering the circumference of ring 110. In an embodiment, only a portion of the circumference of ring 110 includes a touch surface 230 or one or more corresponding touch sensors. In some embodiments, touch surface 230 also includes one or more force sensors to determine the amount of force applied to touch surface 230 when interacted with by a user. While being worn on a digit, other digits, body parts, or other objects may interact with touch surface 230. As discussed herein by receiving an indication of the amount of force applied to touch surface 230, ring program 115 determines if the touch was intentional or accidental. For example, if the amount of force applied to touch surface 230 equivalent or less than a force applied when two fingers brush against one another, then ring program 115 determines the touch interaction was accidental and, as a result, does not process the interaction as input. Ring program 115 determines that interactions with a stronger force applied than an accidental brushing, or other accidental interactions that may occur while ring 110 is being worn, are intentional interactions and, as such, are processed as input.

In some embodiments, ring 110 includes one or more haptic feedback components along touch surface 230 to provide response to touch input from a wearer of ring 110. The haptic feedback components change the pressure exerted by portions of touch surface 230 to provide the sensation of touching a button, even though a physical button is not present in ring 110. In other embodiments, ring 110 includes one or more vibratory motors to provide feedback when receiving input from a user.

In various embodiments, ring 110 includes a rotary sensor to detect rotational movements of touch surface 230, housing 220 or inner ring 210. Based on the change of rotation, the rotary sensor indicates a change in rotation of touch surface 230, housing 220 or inner ring 210. Ring program 115 receives the input from the sensor. Based on the input, ring program 115 determines if rotation occurred and, if so, the amount of rotation. For example, the sensor indicates rotation of a surface of ring 110 has occurred, however, ring program 112 determines that the amount of rotation is not sufficient to send a command corresponding to the received rotation. As the ring is worn, minor amounts of rotation may occur (e.g., two fingers rubbing against one another). Ring program 115 determines that small amounts of rotation are accidental and not send a command associated with rotation to device program 145.

In some embodiments, ring 110 one or more biometric sensors to determine and authenticate the identity of a wearer of the ring. For example, ring 110 includes a fingerprint sensor along touch surface 230. A user wears the ring on a finger. The user places or swipes across a thumb to authenticate usage of ring 110. The fingerprint sensor sends authentication information to ring program 115. In response, ring program 115 authorizes usage for the user and sends commands to device program 145 as the commands are received. As another example, inner ring 210 includes a vascular scanner to determine vein patterns of the digit the ring is worn. As a ring is placed on a digit, the vascular scanner determines and authenticates the identity of the user. The vascular scanner sends authentication information to ring program 115. In response, ring program 115 authorizes usage for the user and sends commands to device program 145 as the commands are received. Additionally the vascular scanner determines if ring 110 is removed. In response to removal, the vascular scanner sends a message to ring program 115 that the user is no longer wearing the ring. As such, ring program 115 ceases the sending of commands device program 145 until authentication is re-established.

By authenticating and identifying a user, ring program 115 provides additional functionality to ring 110. For example, ring program 115 includes one or more profiles of users authenticated to wear and use ring 110. One user may be an adult in a family and has full access to commands and menus of device program 145. Another user is a child in a family. When the child wears the rings and is identified, only a subset of commands or menus of device program 145 are accessible. As another example, ring 110 includes a near-field communication (NFC) tag to perform transactions at a point-of-sale terminal. Upon authentication, ring program 115 enables the NFC tag to permit the tags use for transactions. If ring 110 is removed and cannot be authenticated (e.g., ring 110 is lost or stolen), then ring program 115 disables the NFC tag, preventing unauthorized transactions by other users.

In various embodiments, ring 110 includes one or more rechargeable batteries to supply power to the various devices and components of ring 110. Ring 110 also includes a charging device to recharge the one or more rechargeable batteries. In some embodiments, ring 110 includes one or more induction coils connected to the rechargeable batteries. Additionally, ring 110 includes one or more power conditioning circuits connected to the rechargeable batteries to ensure the power supplied to the rechargeable batteries matches a requirement or specification of the batteries. For example, the power conditioning circuits may step up voltage or ensure a polarity applied to the terminals of the rechargeable batteries. In embodiments with induction coils, the induction coil provide a contact-less mechanism to charge the rechargeable batteries of ring 110. In one embodiment and scenario, a coil (not shown), or primary coil, is connected to a power source (e.g., a wall outlet) thereby generating a magnetic field. A user places ring 110 in proximity to the primary coil, such that the magnetic flux generated by magnetic field of the primary coil induces a current in the induction coil or secondary coil of ring 110. The induced current is transferred to the rechargeable batteries of ring 110, thereby charging the rechargeable batteries of ring 110.

Figure 3:
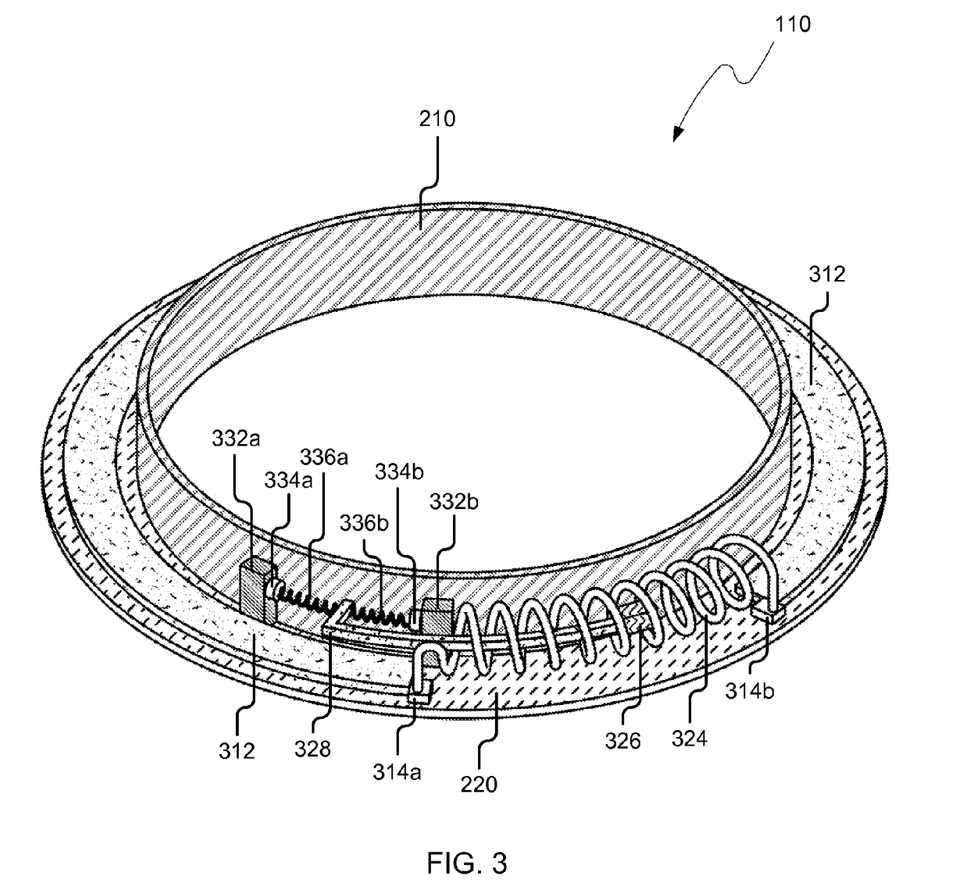
FIG. 3 illustrates a example arrangement of a rotational charging component of a ring that functions as an input device, in accordance with an embodiment of the present invention.

In another embodiment and scenario, ring 110 includes one or more magnets. The one or more magnets of ring 110 are arranged such that when touch surface 230 or housing 220 is rotated, an electrical current is induced in the induction coil of ring 110. Such an arrangement provides a mechanism to charge the rechargeable batteries of ring 110 through the use of ring 110. As a user rotates the ring through daily use to send commands to device program 145, the charge of the rechargeable batteries is replenished. Such a mechanism extends the battery life of ring 110 without removing the ring as described in the above scenario. The movement in the rotation of touch surface 230 or housing 220 is converted into electrical energy stored in the reachable batteries of ring 110. FIG. 3 illustrates an example arrangement of a rotational charging component included in ring 110. FIG. 3 includes inner ring 210 and the bottom portion of housing 220. Touch surface 230 and the top portion of housing 220 are not shown to provide a view of the rotational charging component. In this illustration, touch surface 230 is fixed to housing 220 such that the rotation of both touch surface 230 and housing 220 move independent of inner ring 210.

FIG. 3 includes rechargeable battery 312, electrical components 314a-b, inductive coil 324, magnet 326, and arm 328. In this example, rechargeable battery 312 is a flexible battery to fit the contours of ring 110, thereby maximizing space of the enclosure of ring 110. In some scenarios, one or more batteries are layered and cut to contour the enclosure of ring 110. Electrical components 314a-b connect the ends of inductive coil 324 to battery 312. Electrical components 314a-b include leads to connect battery 312 to inductive coil 324. Additionally electrical components 314a-b may include power conditioning circuit elements such as, but not limited to, voltage regulators or rectifiers.

In this example, inductive coil 324 is coiled in the direction of the circular enclosure between inner ring 210, housing 220 and touch surface 230. In some embodiments and scenarios, more than one inductive coil may be included. For example, more than one rotational induction component may be included in ring 110. In other scenarios, inductive coil 324 is a wound in a linear direction. In this illustrated example, the number of turns of the winding of inductive coil 324 is shown to provide a visual representation of the coil. One of ordinary skill in the art would appreciate that a number of turns in inductive coil 324 may increase or decrease without deviating from the invention. Referring back to FIG. 3, in this example battery 312, electrical components 314a-b and inductive coil 324 are fixed to housing 220. Arm 328 is fixed to inner ring 210. Arm 328 is extends past inner ring 210 and is curved to fit the contours of the enclosure of ring 110. Additionally magnet 326 is fixed to the distal end of arm 328 from inner ring 210. In some embodiments and scenarios, magnet 326 is a rare-earth magnet. A rare-earth magnet is a permanent magnet made from alloys of rare earth elements, such as neodymium ($Nd_2Fe_{14}B$) or samarium-cobalt ($SmCo_5$). Rare-earth magnets have stronger magnetic fields than other certain magnets, such as a ferrite magnet. One of ordinary skill in the art will appreciate that any permanent magnet may be used, either rare-earth alloys or ferrite, without deviating from the invention.

As discussed in this example, housing 220 rotates independently from inner ring 210. Furthermore, inductive coil 324, and similarly battery 312 and electrical components 314a-b, is fixed to housing 220. When a user rotates housing 220, or touch surface 230 in this example, inductive coil 324 moves across the magnetic field produced by permanent magnet 326. Due to the movement of inductive coil 324 across the magnetic field produced by magnet 326, an electrical current is produced based on the user rotating housing 220. Furthermore, in cases when inner ring 210 rotates, the magnetic field of magnet 326 moves along inductive coil 324, also producing a current. In both cases, the generated current recharges battery 312. As such, when housing 220 or touch surface 230 is rotated by a wearer of ring 110, battery 312 is recharged. Such an arrangement allows for a constant recharging of batter 312 throughout daily use.

In some scenarios, additional charging mechanisms may be included, such as but not limited to, electromagnetic inductance of the induction coil (i.e., secondary coil) from another electrically charged coil (i.e., primary coil), direct contacts on the exterior of ring 110 connected to battery 312, an ambient backscatter or radio-frequency (RF) collector, or a movement induction charger (e.g., when a user moves ring 110 the movement is translated into an electrical current). In other scenarios, a user may disengage the communication device of ring 110 to conserve battery. In this mode of operation, a user may continue to charge the battery by rotating housing 220 or touch surface 230. For example, a series of touch inputs on touch surface 230 disconnects the communication device of ring 110 to the communication device of computing device 140. During this mode, less power is used and the amount of charge generated by the rotational induction component or other charging mechanisms replenish more charge of battery 312.

Referring back to FIG. 3, the rotational induction component may also include springs 336a-b, pressure switches 334a-b, and stoppers 332a-b. Stoppers 332a-b are fixed to housing 220. Each stopper 332a-b has a respective pressure switch 334a-b. Springs 336a-b are coupled, respectively, to stoppers 332a-b and opposite sides of arm 328. As either inner ring 210 or housing 220 rotates, a corresponding spring 332a-b compresses and exert an amount of force of pressure switches 334a-b. Pressure switches 334a-b are configured to activate once a predetermined amount of force is applied be the respective springs 336a-b. Ring program 115 receives input from pressure switches 334a-b once the force reaches the threshold to activate (e.g., when the housing is rotated a certain amount and the compressed spring of springs 336a-b exerts enough force to activate the respective pressure switch of pressure switches 334a-b). Such a configuration provides a return-to-center operation as discussed herein (after activation, the spring returns housing to the originating position). Furthermore, the configuration also provides another embodiment of a rotary sensor (e.g., the springs compressing when rotation exceeds a certain amount, indicating to ring program 115 when activation occurs). Additionally, the illustrated configuration of springs 336a-b, pressure switches 334a-b, and stoppers 332a-b providing better charging of battery 312. The faster a magnet moves, the stronger the magnetic field being produced. As such, when springs 336a-b extend after compression, a faster movement of magnet 326 through induction coil 324 is achieved. The faster movement generates a stronger magnetic field passing through induction coil 324, thereby charging battery 312 more efficiently.

Figure 4:
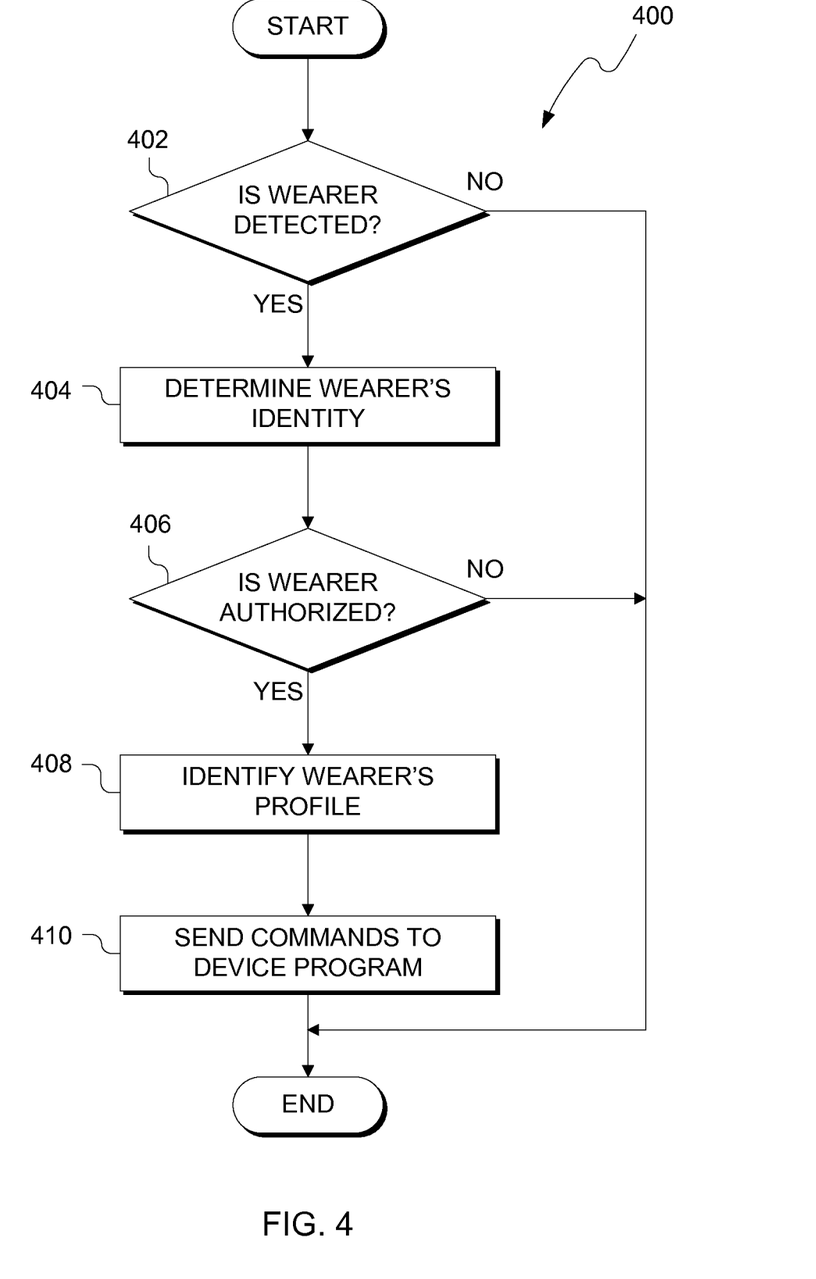
FIG. 4 illustrates operational processes of a ring program for identifying a user, executing on a ring that functions as an input device, within the environment of FIG. 1, in accordance with an exemplary embodiment of the present invention.

FIG. 4 illustrates operational processes of ring program 115 for identifying a user, generally designated 400, executing on ring 110 that functions as an input device, within the environment of FIG. 1, in accordance with an exemplary embodiment of the present invention. In process 402, ring program 115 determines if ring 110 is being worn by a user. Ring 110 includes one or more sensors to determine if ring 110 is being worn by a user. For example, ring 110 includes a heart rate sensor to determine if a pulse is detected. The heart rate sensor sends an indication to ring program 115 that ring 110 is currently being worn by a user. In some scenarios, ring program 115 polls the heart rate sensor to determine if a user is wearing ring 110. If no user is wearing ring 110 (NO branch of process 402), the ring program 115 enters a hibernating state, minimizing power usage and routinely checking the one or more sensors to determine if ring 110 is being worn by a user.

If ring program 115 determines that ring 110 is being worn (YES branch of process 404), then ring program 115 determines the identity of the wearer. In process 404, ring program 115 determines the identity of the wearer. In some embodiments, the sensors used to determine that a user is wearing ring 110 comprise one or more biometric sensors. For example, ring 110 includes a vascular scanner. Upon placing ring 110 on a digit by a user, the vascular scanner sends an indication to ring program 115 that a wearer is detected, such as described in process 402. Additionally, the vascular scanner sends a model or imaging data of the vein structure of the finger of the wearer to ring program 115. Ring program 115 compares the received model to models of one or more users stored on ring 110. Based on a match between the received model to models of one or more users stored on ring 110, ring program 115 determines the identity of the wearer to be the user associated with the matched model stored on ring 110. In other embodiments, ring 110 includes one or more biometric sensors not used in process 402 to determine if ring 110 is being worn. For example, ring 110 includes a fingerprint scanner on housing 220. After ring program 115 detects ring 110 is being worn, ring program 115 alerts the wearer to verify the wearer's identity. In some scenarios, ring 110 may vibrate or illuminate an light emitting diode (LED) to indicate the need for identity verification. In other scenarios, ring program 110 sends a message to device program 145 to alert the user to verify the wearer's identity via the biometric sensors.

In process 406, ring program 115 determines if the identified wearer is authorized to use ring 110. If the biometric information received in process 404 does no match a user's identity stored on ring 110 (NO branch of process 406), then ring program 115 ends processing and waits for a removal of ring 110. Upon a new indication from the sensors of ring 110 that a user is wearing ring 110 (e.g., process 402), ring program 115 repeats processes 402-406 until the identity of the wearer matches an identity stored on ring 110. If ring program 115 determines a match between the received biometric information in process 404 to an identity stored on ring 110, then ring program 115 identifies a profile associated with the matched user. In process 408, ring program identifies the profile associated with the wearer. A profile for a wearer may include information describing one or more devices, and their respective programs, that ring program 115 can connect to. A profile may also include a configuration for mapping input received by ring program 115, when a user interacts with ring 110, to commands or operations to be executed by device program 145. For example, one profile for a user indicates that rotating ring 110 will change the volume on a connected Smart TV. Another profile for a different user indicates that that rotating ring 110 will change the channel on the Smart TV. A profile may also indicate a mode of operation for device program 145. For example, an adult user has full access to a video streaming service. Whereas, a child user only has access to videos approved for children. After the profile is identified, ring program 115 sends corresponding commands, based on interactions by a wearer with ring 110, to device program 145 (process 410).

Figure 5:
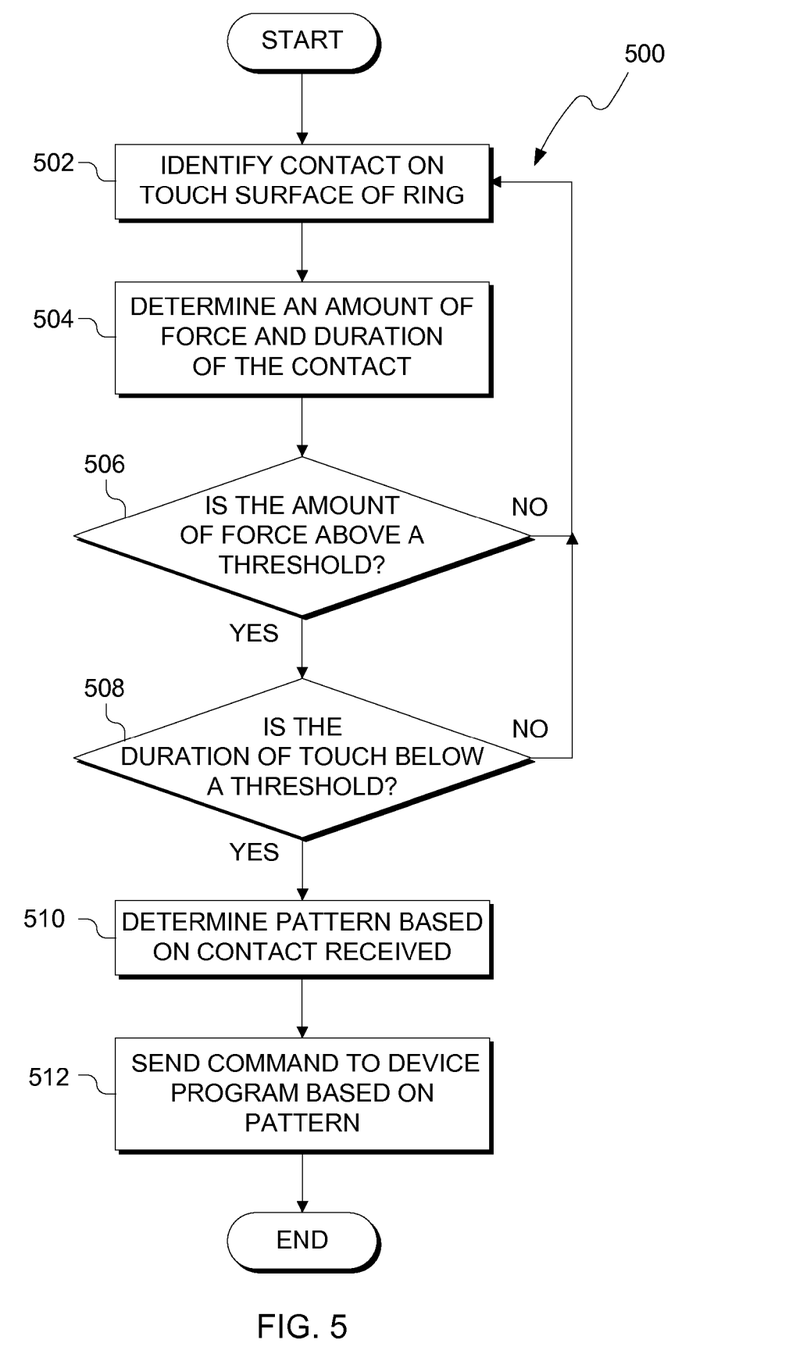
FIG. 5 illustrates operational processes of a ring program for determining intentional touch inputs, executing on a ring that functions as an input device, within the environment of FIG. 1, in accordance with an exemplary embodiment of the present invention.

FIG. 5 illustrates operational processes of ring program 115 for determining intentional touch inputs, generally designated 500, executing on ring 110 that functions as an input device, within the environment of FIG. 1, in accordance with an exemplary embodiment of the present invention. As a user of ring 110 wears ring 110, accidental contact with touch surface 230 may occur. When worn on a finger, adjacent fingers or other portions of the user's body may brush against touch surface 230. As discussed herein, ring program 115 includes processing to determine when a touch input is intentional or accidental. In process 502, ring program 115 identifies that touch surface 230 of ring 110 is contacted by the wearer of ring 110. Touch surface 230 includes one or more touch sensors that indicate a wearer of ring 110 is in contact with touch surface 230. In process 504, ring program 115 determines an amount of force and duration of the contact made with touch surface 230. One or more sensors in touch surface 230 send information to ring program 145 regarding the amount of force being applied to touch surface.

In process 506, ring program 115 determines if the amount of pressure exceeds a certain threshold. If the amount of force is below the threshold amount (NO branch of process 506), then ring program 115 ignores the contact made and waits for a new contact with touch surface to occur (process 502). By ignoring contact that has a minimal amount of force applied to touch surface 230, ring program 115 accounts for accidental inputs where a user may quickly brush against ring 110. If the amount of force is above a certain threshold (YES branch of process 506), then ring program 115 determines if the duration of the contact is below a certain threshold (process 508). If the contact is for an extended amount of time (NO branch of process 508), then ring program 115 ignores the contact made and waits for a new contact with touch surface to occur (process 502). By ignoring contact with a long duration, ring program 115 accounts for unintentional contacts that generate a large enough amount of force but are not as deliberate as a quick tap on touch surface 230, such as grasping objects with the hand ring 110 is worn on. If the amount of time contact is made with touch surface is below the threshold (YES branch of process 508), then ring program registers the input.

In process 510, ring program 115 determines if the received contact is part of a pattern. As each contact is made with touch surface 230, ring program 115 stores a representation of one or more contacts made with touch surface 230 that are both of an appropriate force and duration. Ring program 115 stores previous contacts made within a certain amount of time. For example, ring program 115 stores each contact made by the wearer over the last five seconds. The types of contacts may be grouped in different categories such as short presses, long presses, light presses or hard presses. Also a pattern may be determined based on the time between contacts, such as two short presses, a second without contact, and a long press. Ring program 115 matches the received contacts made by the wearer to one or more patterns stored a storage device of ring 110. Based on the matched pattern, ring program 115 selects a command associated with the matched pattern. In process 512, ring program 115 sends the selected command to the device program 145 based on the received pattern of contact made by the wearer.

Figure 6:
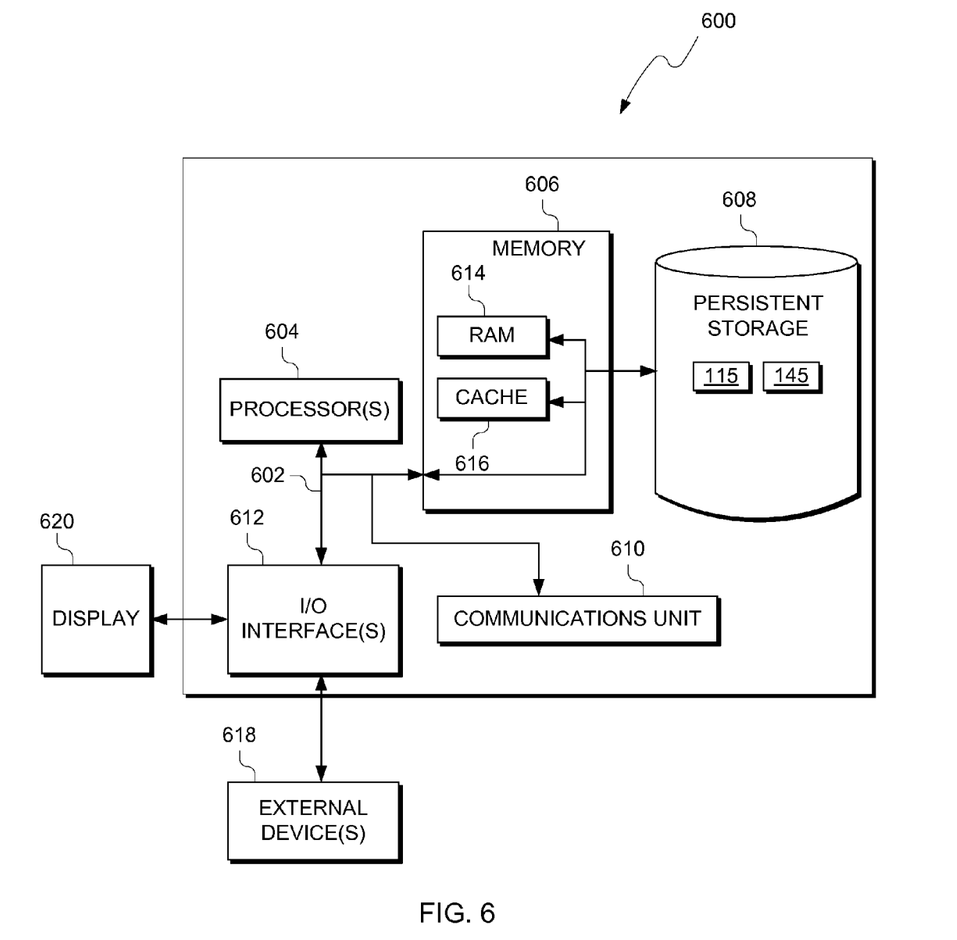
FIG. 6 depicts a block diagram of components of the computing device executing a ring program or device program, in accordance with an exemplary embodiment of the present invention.

FIG. 6 depicts a block diagram, 600, of components for each of ring 110 and computing device 140, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Ring 110 and computing device 140 each include communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media.

Ring program 115 and device program 145 are each stored in the respective persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices, including resources of network 120. In these examples, communications unit 610 includes one or more network interface cards. Communications unit 610 may provide communications through the use of either or both physical and wireless communications links. Ring program 115 and device program 145 may be downloaded to persistent storage 608 through communications unit 610.

I/O interface(s) 612 allows for input and output of data with other devices that may be each connected to ring 110 and computing device 140. For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention, e.g., Ring program 115 and device program 145, can each be stored on such portable computer-readable storage media and can be loaded onto persistent storage 608 via I/O interface(s) 612. I/O interface(s) 612 also connect to a display 620.

Display 620 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A method for determining intentional input to a touch surface of a wearable device, the method comprising:
   identifying, by one or more processors, a first interaction by a user with the touch surface;
   determining, by the one or more processors, an amount of force applied by the first interaction;
   determining, by the one or more processors, a duration the first interaction occurred;
   responsive to the amount of force applied by the interaction being above a first threshold and the duration the interaction occurred being below a second threshold, storing, by the one or more processors, the first interaction.

2. The method of claim 1, the method further comprising:
   determining, by the one or more processors, a command based, at least in part, on the first interaction; and
   sending, by the one or more processors, the command to a computing device for execution by the computing device.

3. The method of claim 1, the method further comprising:
   identifying, by one or more processors, a second interaction by a user with the touch surface;
   determining, by the one or more processors, an amount of force applied by the second interaction;
   determining, by the one or more processors, a duration the second interaction occurred;
   responsive to the amount of force applied by the interaction being above a first threshold and the duration the interaction occurred being below a second threshold, storing, by the one or more processors, the second interaction.

4. The method of claim 3, the method further comprising:
   determining, by the one or more processors, a command based, at least in part, on the first interaction, the second interaction, and a duration of time between the first interaction and the second interaction; and
   sending, by the one or more processors, the command to a computing device for execution by the computing device.

* * * * *